United States Patent [19]
McAlister

[11] Patent Number: 6,015,065
[45] Date of Patent: Jan. 18, 2000

[54] COMPACT FLUID STORAGE SYSTEM

[76] Inventor: Roy E. McAlister, 1739 W. 7th Ave., Mesa, Ariz. 85202-1906

[21] Appl. No.: 08/921,134

[22] Filed: Aug. 29, 1997

[51] Int. Cl.⁷ ............................. B65D 25/02; F17C 1/06
[52] U.S. Cl. .................... 220/586; 220/501; 220/560.08; 220/590
[58] Field of Search ............................ 220/560.04, 577, 220/581, 582, 584, 586, 588, 589, 590, 592

[56] References Cited

U.S. PATENT DOCUMENTS

| | | | |
|---|---|---|---|
| 3,935,354 | 1/1976 | Olcott | 428/107 |
| 4,588,106 | 5/1986 | Stark, Sr. et al. | 220/590 |
| 5,284,996 | 2/1994 | Vickers | 220/590 |
| 5,648,184 | 7/1997 | Inoui et al. | 429/105 |
| 5,772,938 | 6/1998 | Sharp | 220/589 |
| 5,822,838 | 10/1998 | Seal et al. | 220/586 |

Primary Examiner—Stephen Castellano
Assistant Examiner—Niki M. Eloshway

[57] ABSTRACT

A compact storage system for fluids is provided by multitudes of closely spaced parallel planes of adsorptive material (88) that is contained within a substantially impervious barrier layer (2). In normal pressure-containing embodiments, reinforcement (4) is wrapped upon the impervious barrier layer (2) to increase the burst strength of the assembly that results. In higher pressure containing embodiments, material (88) provides reinforcement of barrier layer (2).

12 Claims, 2 Drawing Sheets

COMPACT FLUID STORAGE SYSTEM

This invention concerns the storage of fluids in portable containers. Gases such as hydrogen, methane, oxygen, nitrogen, and helium present difficult storage problems. They must be cooled to very low temperatures to be stored as cryogens at atmospheric pressure. Storage of desired commercial and transportation-fuel quantities at ambient temperature requires very high pressures.

Previous improvements in compact gas storage include the storage of acetylene in acetone and the storage of natural gas on activated carbons. Attempts to extend the surface area per gram of material include Fullerines, Fullerides, Fulleroids, carbon nanotubes, carbon whiskers, and carbonized: aerogels, foams, and natural fibers such as spider webs, etc. These examples fall short of the ability to compactly store natural gas and hydrogen at densities capable of competing with liquid-state storage. Storage in carbon: nanotubes, crystalline whiskers, and within pores of particles pose the common problem of limited material efficiency because of the surface-to-volume characteristics and because these substrate geometries do not facilitate multiple-layer storage between expansive parallel surfaces.

The present invention overcomes the difficult storage problems of many potentially plentiful but relatively under-utilized gases.

Objects and advantages of the present inventions include:

1. Provision of compact storage and retrieval system for gases such as hydrogen, methane, oxygen, nitrogen, and helium.
2. Provision of a low-cost method of manufacturing high-yield gas storage systems.
3. Provision of a system for controlling the rate of heat addition to endothermic releases of adsorbed gases.
4. Provision of optimized separation dimensions within extremely high surface-to-weight gas adsorption systems.
5. Provision of a system for enhancing heat removal during exothermic adsorption of gases.
6. Provision of a radially and axially reinforced, high strength fluid storage system capable of safely storing fluids at very high storage-pressure to system-weight ratios.
7. Provision of thin films of adsorbed liquids on extended surfaces to enhance adsorption capacities of certain gases.
8. Provision of ways to improve over the limitations of gas storage in micro pores, scrolls, whiskers, and miniature tube structures.
9. Provision of multiple-molecular-layer fluid storage between expansive parallel surfaces.

Other objects and advantages will become apparent from the specification and drawings.

DESCRIPTION OF THE PREFERRED EMBODIMENTS

Figure 1:
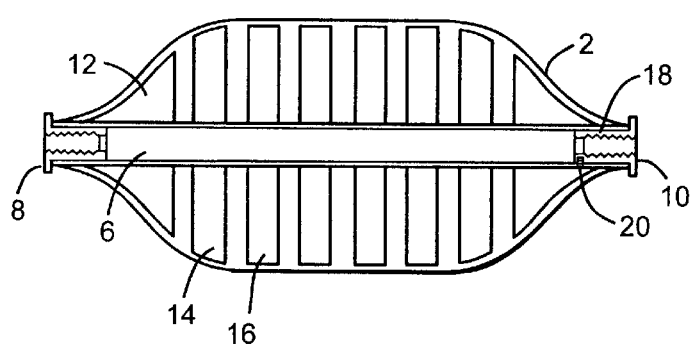
FIG. 1 is a longitudinal sectional view of a device constructed in accordance with the principles of the present invention.
Figure 2:
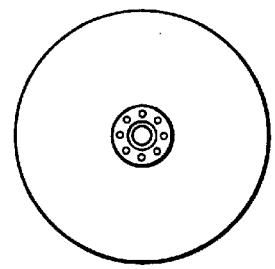
FIG. 2 is a sectional end view of an embodiment of the invention.
Figure 3:
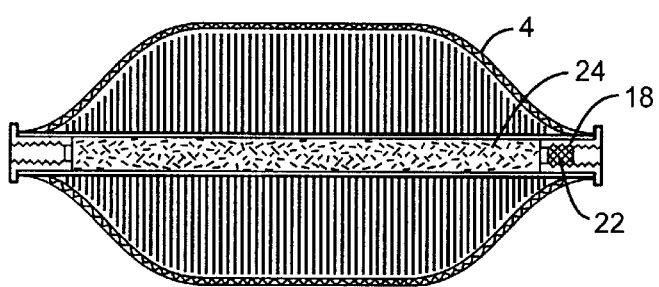
FIG. 3 is a longitudinal sectional view of an embodiment of the present invention.
Figure 4:
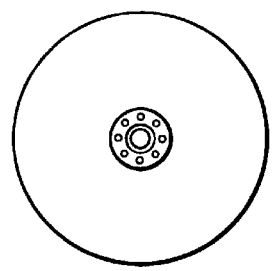
FIG. 4 is a sectional end view of the embodiment of FIG. 2.

FIG. 1 illustrates a cross-section of a compact storage system. Impermeable pressure vessel liner 2 is preferably manufactured as a thin walled vessel which is supported by higher strength filament windings 4 as shown in FIG. 3. Suitable liner vessels include those manufactured from a variety of materials including steel, aluminum, titanium, glass, and plastics. Vessel 2 is preferably fitted with suitable connections 8 and 10 at both ends as shown.

Tube 6 is porous, slotted, or made of wire cloth and has the function of supporting crystals of graphite such as 12, 14, and 16. It is preferred to use single crystals or stacks of crystals of the same crystalline orientation of cleavable materials such as graphite or hexagonal boron nitride. A particularly useful orientation of the hexagonal single crystals is with the closely packed 0001 planes substantially perpendicular to tube 6.

Single crystals 12, 14, and 16 may be deposited as pyrolylic graphite upon a suitable substrate that provides the desired shape as shown. Materials suitable as molds for depositing pyrolylic graphite ("PG") in the shapes shown are boron nitride ("BN"), tungsten carbide ("WC"), titanium carbide ("TiC"), boron carbide ("BC"), and refractory metals. It is also possible to machine single crystals of BN or PG to the desired shapes from larger blanks.

Single crystals of desired shapes are bored to allow free insertion of support tube 6. Liner 2 may be a deep-drawn two piece assembly, a spin formed part, or a longitudinally seamed assembly. Liner 2 is assembled over the single crystals and welded or joined to fittings 8 and 10 as shown.

Several methods have been found suitable for preparing separated layers of crystalline materials such as graphite including impregnation with halogens, silver, aluminum, manganese, active metals, iron, zinc, ammonia, pyradines, and keytones. Active metal impregnates may contribute electrons to the graphite crystals. Non-metallic ions and atoms may be provided electrons from the aromatic carbon crystals. These chemical bonds define the impregnate's resulting electron configuration, location, and crystal-layer spacing characteristics. Contributing electrons to the carbon crystals strengthens the crystals. Thus, basal planes are separated and strengthened by chemical bonds with impregnants in the space between said planes.

In another approach, the assembly is placed in suitable tooling anvils (not shown) that support the outside surface of liner 2. Heated hydrogen is then admitted through fitting 8 and the assembled single crystals are warm soaked in a fluid such as hydrogen until a uniform concentration of hydrogen has diffused into each crystal. In order to achieve suitable entry of hydrogen into the graphite crystals it has been found to be particularly advantageous to coat the graphite crystals with materials that perform catalytic roles including production of atomic hydrogen from diatomic hydrogen and diffusion of the atomic hydrogen into solution within the graphite.

Coatings sufficient for this purpose include the platinum metal group, rare earths, palladium-silver alloys, titanium, and alloys of iron-titanium, iron-titanium-copper, and iron-titanium-copper-rare earths. It is sufficient to apply very thin coatings of such materials by vapor deposition, sputtering, or electroplating techniques. After the coatings have served the purpose of entering hydrogen into solution within the graphite it is preferred to remove the coating materials for reuse.

Sudden pressure release causes the hydrogen impregnate to move into areas of least-dense packing and to form gaseous layers. Hydrogen gas pressure causes the exfoliation of each 0001 plane. Additional separation can be accomplished by repeating the exfoliation cycle with successively larger molecules such as methane, ethane, propane, and butane. By controlling the amount of hydrogen that enters the crystals, the temperature at the start of expansion, and the physical limits of crystal growth, separation of the 0001 planes can be achieved. Regardless of which approach is utilized for separation of the parallel layers it is preferred to adhere or suitably lock the layers to membrane 2 or to stake the separated layers to 6 soon after the spacing operation.

Separation distances are chosen to allow storage of several layers of storage gas. Separation of 12 to 15 A (angstroms) allows methane to form two dense monolayers of each face of adjacent planes of exfoliated media. Additional low pressure storage of gas that is more or less arrested if not actually adsorbed is provided by the resulting geometry.

Capillary states result when the spaces between the 0001 planes are 15 A or larger and the spaces between adsorbed monolayers are filled with molecules that transfer kinetic energy to the 0001 planes and tend to occupy about the same molecular volumes as adsorbed gases, liquids, or solids. In the instance of storing gases like hydrogen and methane it has been found advantageous to first plate the exposed carbon surfaces with a lower vapor pressure substance such as butane or propane.

It has also been found advantageous to store mixtures of methane and hydrogen for the purpose of producing greater energy storage densities than either gas stored separately. It is envisioned that this advantage results from more efficient volumetric packing efficiency in multiple layers of molecules that assume more or less crystalline arrangements in the spaces between expansive parallel layers of graphite crystals.

During exfoliation, the precursor crystals 12, 14, 16 grow in the direction perpendicular to the 0001 planes to fill the space available. It is preferred to use several crystals spaced as shown in FIG. 1. This provides uniform separation distances. It has been found helpful to excite the crystals with ultrasonic energy to hasten hydrogen diffusion into the crystals and at the time of pressure release to improve exfoliation uniformity.

After exfoliation to desired separation distances the freshly prepared adsorption media is arrested to prevent further shuffling in the axial locations of the 0001 layers. Several suitable methods may be utilized including:

1. Injecting a thermoplastic resin through fitting 10 to produce as molded interference or "staking" fit. Thermoplastic polymer molecules usually are many times larger than the optimal spacing between 0001 layers. Suitable thermoplastics include polyolefins, fluoro-olefins, polyesters, and vinyls. It is preferred to use tube 6 as an equiaxed-flow distributor of the staking resin. Injected thermoplastic first fills tube 6 and then uniformly passes radially under hydrostatic pressure to stake the exfoliated planes in place.
2. Injecting a thermosetting mixture such as an epoxy resin. This technique has the advantage of producing less stress on the staked planes than using injection molded thermoplastic.
3. Substituting an expandable mechanical collet for tube 6. Suitable materials include thermoplastics, aluminum, magnesium, and copper alloys.
4. Using a self-rising foam 24 such as polyurethane or a reaction-injection-molded foam to create a radial loading against the properly spaced planes.

Fitting 8 my be of any suitable configuration including designs with internal or external straight or tapered threads, quick-coupling types, o-ring sealed fittings, and flange-gasket systems. The functions of fitting 8 are to provide a high strength port through which escaping hydrogen can quickly exit during the exfoliation process and to provide access for placement of the exfoliated sheet staking compound. After placement of the staking compound and sealing the chamber, fitting 8 my be utilized to as one tie point to mount the tank as desired.

Fitting 10 may be of any suitable configuration including designs with internal or external straight or tapered threads, quick-coupling types, o-ring sealed fittings, and flange-gasket systems. One function of fitting 10 is to provide flow to and from the space within tank liner 2. Holes 18 allow flow to and from the space within the tank. Further functions of fitting 10 are to provide a high strength port thorough which escaping hydrogen can quickly exit during exfoliation; to provide for plugging off tube 6 beyond the adsorption media after exfoliation; and to provide flow to and from the storage media after the staking operation.

Plug 20 maybe of any suitable design including a socket-set screw, a wire cloth form, a crushed gauze, or a sintered metal filter 22 that prevents passage of staking materials but which allows filtration of gases passing into and out of tank 4 through holes 18.

FIG. 3 shows a cross-section of the exfoliated crystals which have been staked by a suitable compound. Port 8 is plugged and port 10 has been fitted with filter body 22.

Utilizing the novel aspects of shaped single crystal pre-forms and arrestment of exfoliated layers as illustrated with respect to the embodiment of FIG. 3, allows the development of efficient gas storage in virtually any container shape. Long thin tubes are envisioned for stream-lined applications such as torpedo propulsion fuel storage. Spherical tanks are envisioned for least-weight fuel storage systems.

Figure 5:
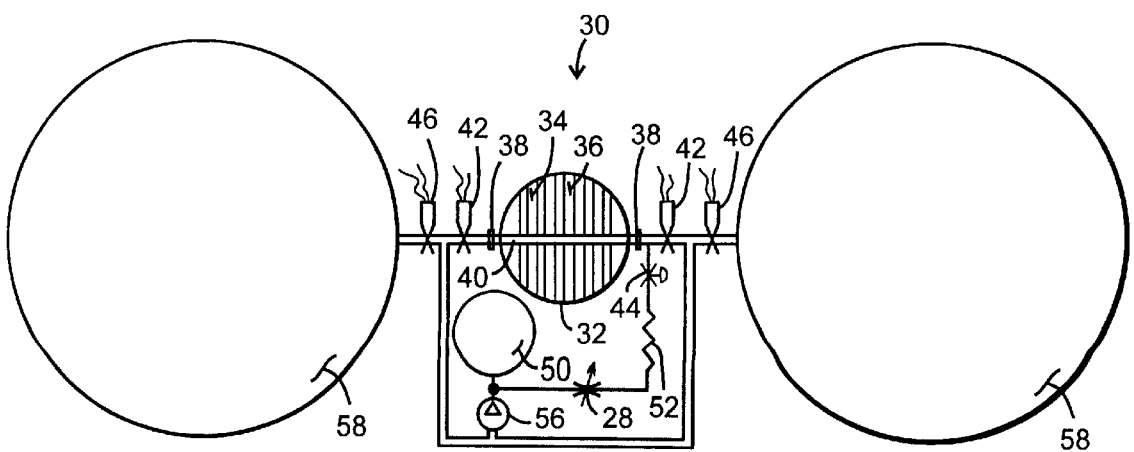
FIG. 5 is a schematic of an embodiment of the invention.

FIG. 5 schematically illustrates a system for exfoliating adsorption media by using impregnating fluids. Adsorption tank 30 is prepared as described above with exterior tank 32, shaped crystals 34, 36, etc., fittings 38 and perforated tube 40. Pressurized fluid such as hydrogen is delivered from accumulator 50 to pressure regulator 28 and then to heat exchanger 52. Heated hydrogen is then passed through valve 44 into tank 32 to charge the single crystals. Tank 32 may be heated by any suitable means including the use of heated anvils that conform to the surface of tank 32. After a sufficient time the hydrogen is diffused throughout the single crystals.

Pressurization of tank 32 at pressures higher than the normal operating pressure is contemplated in instances that conformal anvil tooling is utilized to limit strain on tank 32. It is also contemplated that heated conformal anvil tooling would be used for stress relieving tank 32 before and after the exfoliation process.

While developing desired concentrations of hydrogen in the single crystals, valve 44 is closed. Valves 46 are opened, and vacuum tanks 58 are evacuated by pumping system 56. Hydrogen evacuated from tanks 58 are evacuated by pumping system 56. Hydrogen evacuated from tanks 58 is stored in accumulator 50.

Exfoliation is accomplished by rapidly opening solenoid valves 42 and allowing hydrogen in the single crystals to migrate to low packing efficiency areas where gaseous layers form. Hydrogen escapes to tanks 58 leaving exfoliated layers of two dimensional crystals.

Pyrolytic graphite ("PG") has a density of about 2.26 grams per centimeter. It can be grown to desired shapes or machined to desired shapes. By complete exfoliation, a cubic centimeter of PG can produce about 9680 square meters of new surfaces:

ATOMS PER CUBIC CENTIMETER $$\frac{(2.26 \text{ grams})}{\text{cm}^3} \frac{6.02 \times 10^{23} \text{ atoms}}{\frac{12 \text{ grams}}{\text{mole}}} \text{mole} = 1.13 \times 10^{23} \frac{\text{atoms}}{\text{cm}^3}$$

ATOMS PER EDGE OF CUBIC CENTIMETER $\sqrt[3]{1.13 \times 10^{23}} = 48,399,539$ atoms on each edge of a cubic centimeter

EXFOLIATED AREA PER CUBIC CENTIMETER $$1 \text{ cm}^2 \frac{(48,399,539 \text{ layers})}{10,000 \text{ cm}^2/\text{m}^2} \frac{(2 \text{ surfaces})}{\text{layer}} = 9,679.9 \text{ m}^2/\text{cm}^3$$

SURFACES DEVELOPED PER GRAM $$\left(9679.9 \frac{\text{m}^2}{\text{cm}^3}\right)\left(2.26 \frac{\text{cm}^3}{\text{gm}}\right) = 4,283 \text{ m}^2/\text{gram of graphite.}$$

Fullerines, nanotubes, and scrolled whiskers have one-atom-thick walls but fail to present the needed large-area expanse of parallel surfaces of one-atom-thick walls that the present invention provides for storage of multiple layers of fluid molecules between multitudes of such crystalline walls. The present invention has much greater capacity for storage of fluids in multiple molecular layer condensed states.

Equally important to the formation of large surface areas per gram is the preparation of large expanses of parallel surfaces of material with high thermal conductivity for purposes of removing heat on fluid adsorption and adding heat to facilitate fluid removal. The present invention accomplishes these purposes far better than previous approaches to multilayer storage of fluids and for desired operational heat transfers. This combination enables alternative fuels such as hydrogen and landfill methane to be stored as multiple motion-arrested layers between expansive parallel one-atom thick walls at energy densities approaching that of gasoline.

Following exfoliation to suitable spacing between the densely packed 0001 layers, tank assembly 30 is heated to bake-out hydrogen. Depending upon the materials of construction and the choice of adsorption media, the vacuum bake-out temperature may be from 120° C. to 1,600° C. After bake-out the tank is cooled to ambient temperature and back filled to ambient pressure, preferably with the gas or fluid which will be stored.

Tank assembly 30 is then disconnected from the exfoliation circuit at fittings 38, filter strainer 22 is inserted, and the staking compound is injected through tube 40 to retain the exfoliated layers. In instances that the selected staking compound produces gaseous by-products it is preferred to provide a tooling vent through fitting 38 for preventing contamination of the exfoliated surfaces by the gases from the staking compound.

Figure 6:
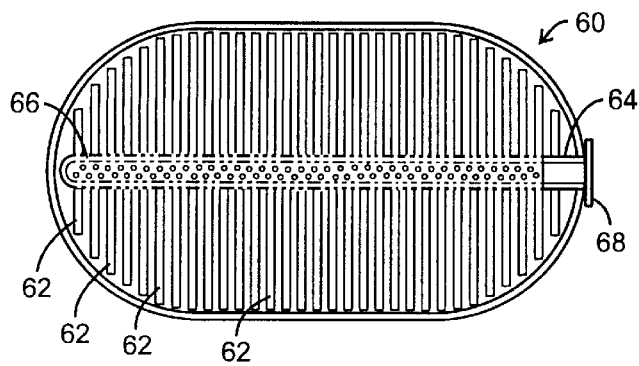
FIG. 6 is a longitudinal sectional view of a device constructed in accordance with the principles of the present invention.
Figure 7:
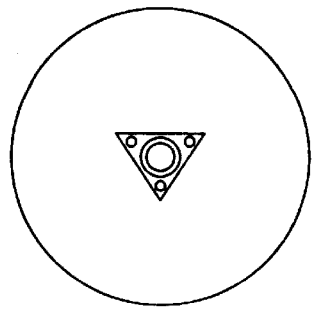
FIG. 7 is a sectional end view of the embodiment of the invention shown in FIG. 6.

Another embodiment of the invention is shown in FIG. 6. As shown in the cross-section of FIG. 6, foil strips or tapes 62 of graphitic composition are wound in a helical spiral around a central mandril 64. Materials suitable for the spiral coils 62 include graphite fabrics in plain or satin weaves such as those provided by Hercules Incorporated P.O. Box 98, Magna, Utah 84044, and "grafoil" ribbon from Union Carbide Corporation, Old Ridgebury Rd, Danbury, Conn. 06817.

Mandril 64 may be a solid wire or bar stock of aluminum, steel, titanium, or magnesium alloy. In the embodiment shown, however, mandril 64 is a perforated tube and thus serves as a support for graphite spirals 62 and as a gas inlet and outlet manifold. Perforations or holes 66 allow free circulation of gases into and out of graphite spirals 62. Fitting 68 provides flow to and from the tank assembly.

Spiral(s) 62 are loosely wound from controlled lengths of graphite foils or tape in order to form best fits for given tank geometries as shown. Spiral(s) are preferably wound with sufficient spacing between each layer to provide room for expansion upon exfoliation.

Exfoliation is accomplished as detailed with respect to the construction of the embodiment of FIG. 1. The assembled tank is loaded with exfoliation gas, hot aged to expedite diffusion of hydrogen or other suitable gases such as helium throughout the crystals of the spiral media, and vacuum shocked to cause exfoliation of each crystal.

Because of the multi-crystalline nature of the graphite in spirals 62, the exfoliated media that results grows in varying amounts in all directions. Orientations from the original tape or foil preparation and of the exfoliated spirals within tank 68, provide for greatest exfoliation growth in directions perpendicular to the length axis of the foil. Woven graphite yarns provide growth perpendicular to the axis of the yarn fibers.

Suitable graphite crystals may be produced by carbon saturation of iron-carbon melts that precipitate graphite sheet material upon slow cooling.

Growing single crystal preforms is preferably by deposition of carbon from landfill methane, natural gas, or coal sources. Pyrolytic graphite is produced by dissociation of methane and other hydrocarbons at 1700° C. and higher temperatures at 25–150 mm Hg pressure:

$$CH_4 \rightarrow C + 2H_2$$

The hydrogen produced by dissociation of hydrocarbons may be recovered for use as an engine fuel. U.S. Pat. No. 5,394,852 discloses a particularly efficient method for burning hydrogen in internal combustion engines. It is preferred to burn hydrogen as engine fuel and to utilize the engine's shaft power to drive an electrical generator. Pyrolytic graphite is, therefore, produced by a natural gas fueled cogeneration plant. On-site use of or sales of electricity are contemplated as important opportunities for reducing the cost of pyrolytic graphite.

Pyrolytic graphite deposits may be a single crystal having the shape of the surface upon which it is grown. Basal planes (0001) are parallel to the surface of deposition. The hexagonal lattice interatomic distance is about 1.415 A and the distances between 0001 planes is about 3.4 A to 3.5 A rather than 3.35 as in natural graphite. This accounts for a slightly lower density, and lower electrical and thermal conductivities in the perpendicular direction than with natural graphite.

This greater distance between basal planes also assists in the exfoliation processes. Hydrogen, helium and other exfoliation gases are able to penetrate the pyrolytic graphite more easily. The Van der Waal bonding energy between basal planes is only about 1.3 to 1.6 Kcal/g-atom in natural graphite. Thus the basal planes of pyrolytic graphite are more easily forced apart during exfoliation. The bonding strengths in basal planes are virtually equal in natural and pyrolytic graphite at 150–170 Kcal/g-atom.

Figure 8:
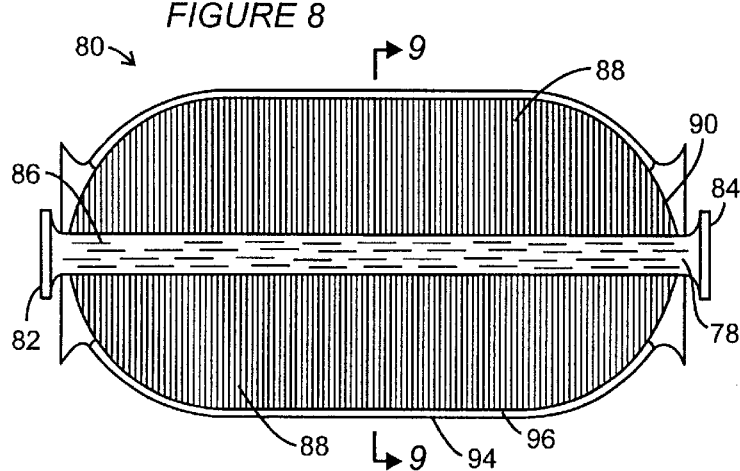
FIG. 8 is a longitudinal sectional view of a device constructed in accordance with the principles of the present invention.

FIG. 8 illustrates an embodiment of the invention that utilizes the unusual physical properties of the basal planes to radially reinforce a pressure vessel while facilitating control of heat transfer processes. Pyrolytic graphite single crystals are grown or machined to desired shapes such as those shown in FIG. 1. A hole is bored through the center of each crystal to accommodate a suitable perforated tube or wire cloth central tube, 78.

The functions of the central tube are to hold the crystals in place during exfoliation, to provide longitudinal reinforcement to the composite tank assembly and to circulate gases through perforations 86 into and out of the layers of exfoliated graphite or boron nitride. After assembly of the central tube within the single crystals, fitting 84 is welded in place. The distance between flanges of fittings 82 and 84 is designed to allow the crystals to exfoliate to desired basal-plane spacings.

Exfoliation is accomplished by impregnation as noted above or loading the crystals and tube assembly into a chamber (not shown) with provisions for heating, changing atmosphere, and rapid vacuum treating. The assembly is hot soaked in an exfoliation gas such as hydrogen or helium and suddenly depressurized or vacuum shocked to cause exfoliation of the crystals. The assembly is then baked to remove residual exfoliation gas.

Outside "edge" surfaces of the exfoliated crystals 88 are then coated with a suitable high strength adhesive or diffusion braze formula and encased within a suitable low-permeability membrane 90. Exfoliated basal planes form a high strength radial reinforcement to the membrane. A very low-weight, high-strength structure results.

Adhesives suitable for the embodiment of FIG. 8 include: thermosets such as epoxies, phenol-formaldehyde, melamine-formaldehyde, silicones and addition-polyimides; including those containing siloxane; and thermoplastics such as aromatic polyesters, unsated polyesters, and polyetherimides. The outside edges may also be coated for diffusion bonding of 88 to 90. Suitable membranes for 90 include wrapped, deep-drawn, or spin formed titanium, aluminum, stainless steels, and electro-formed nickel. Coatings include soldering, brazing, and diffusion bonding selections.

Composite membranes include metallized thin films of polyethylene terephthalate, ethylene chlorotrifluoroethylene, polyvinylidene fluoride, and polyolefins. The materials used for metallizing include iron, aluminum, titanium, chromium, nickel or sputtered alloys. The use of carbon deposits including those described in "Dual Ion Beam Deposition of Carbon Films with Diamond Like Properties" NASA TM-83743 (N31512/NSP), are contemplated as aids to the joining of basal planes 88 to membrane 90.

Basal planes of hexagonal boron nitride and pyrolytic graphite have high thermal conductivities. Joining the circumferential surfaces of exfoliated basal planes to an outside membrane that provides high heat transfer rates provides a method for controlling the heat exchange to and from fluids stored within the resulting structure. The highest heat transfer system for joining the basal planes to the outside membrane would be by diffusion bonding using suitable coatings to develop desired properties.

Controlled heat transfer is facilitated by incorporating an extended surface metal foil fin 92 over impermeable membrane 90. Corrugated fin 92 is covered by an insulative membrane 94 to produce a honeycomb of passageways 96 through which a heat transfer fluid may be circulated or stagnated for purposes of heat-transfer control. Suitable fluids for heat transfer include hydrogen, air, water, engine exhaust, and other heat transfer fluids. Materials suitable for membrane 94 include thermoplastics and thermo-setting compounds which may be reinforced or unreinforced.

In weight-sensitive applications it is contemplated to form corrugated fins 92 over the spherical ends of membrane 90 and to metallurgically bond the contact areas to membrane 90. Insulative membrane 90 may be a composite of a flexible polymer foam and a shrink tube of polyvinylidene fluoride. Heat transfer fluids such as hydrogen, helium, air, water, ethylene glycol and hydraulic oils are contemplated.

In transportation applications, filtered ambient-temperature air may be circulated through passageways 96 to remove heat from the exfoliated planes as fuel gases are loaded into storage as adsorbed monolayers and as "arrested" gases between monolayers. In this context, "arrested" means that gases have entered the space between the monolayers on exfoliated substrates, transferred energy to the substrates and as a result have reduced effective vapor pressures.

Figure 9:
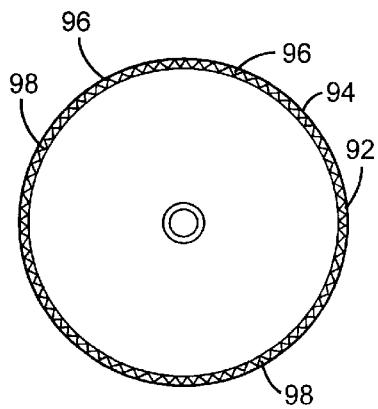
FIG. 9 is a sectional end view of the embodiment of the invention shown in FIG. 8.

In embodiments like the system of FIG. 8, desired reinforcement in the direction transverse to the radial reinforcement of the exfoliated planes may be accomplished by use of high-strength rovings or yarns or fibers applied over membrane 90. In instances that longitudinal corrugations such as the heat transfer fins 92 are employed, it is preferred to apply axial reinforcement rovings 98 over the corrugated surface of 92 as shown in FIG. 9. This allows the corrugated surface of 92 to serve as a load spreader against membrane 90 while avoiding interference with heat exchange between membrane 90 and fin 92.

Suitable high strength reinforcement yarns, and cables are made from boron, boron nitride, carbon, graphite, glass, silicon carbide, refractory metals, and ceramic fibers. Protection of axial yarns used for tank reinforcement is contemplated. Epoxy, polyamide varnishes and other popular adhesion and matrix resins are suitable as adhesive coatings on yarns and cables used as axial tank reinforcement systems.

In instances that basal plane separation distances exceeding those readily achieved by hydrogen or helium are desired, it is contemplated that exfoliation with fluids such as iodine, phosphoric acid, zinc chloride, sulfuric acid, potassium sulfide, water, halocarbon refrigerants, and ammonia would be accomplished. Such exfoliation would involve impregnation of the space between the basal planes with a fluid, heating to temperatures between 400 and 1,800° C. with or without the aid of a vacuum, to cause sudden vaporization and expansion of the fluid to force further separation of the basal planes.

Therefore considerable weight reduction is potentially offered by the use of a thin membrane 90 supported radially by basal planes of exfoliated media and axially by high strength fibers. Pressure vessel walls can generally be reduced to about ½ the thickness of designs without the reinforcing disks. Anchoring axial fibers to flanges 8 on the ends of tube 78 are contemplated along with wrapping and securing axial fibers around the neck of tube 78.

Further weight savings are produced by separation of the exfoliated basal planes to distances in the order of 350 A or more. This reduces the exfoliated crystal bulk density of pyrolytic graphite or boron nitride from 2.26 grams per cubic centimeter to 0.02 grams per cubic centimeter or less. A tank 20 cm in diameter and 120 cm long with spherical ends could have about 700 grams of radial reinforcement disks on 360 A centers; diffusion bonded titanium skin, 0.025 centimeters thick, having a mass of 480 grams; axial reinforcement of graphite yearn having a mass of 800 grams; and offer a burst pressure of over 40.2 MPa (6,000 PSI). The total tank would have a mass of about 2,300 grams and deliver more than 35,000 cubic centimeters of fluids. This shows the great advantage in utilizing the interior plates in tensile load bearing strengthening of the containment membrane.

The same reinforcement principles of my invention's previous example allow a tank with an assembled mass of less than 16,000 grams to safely withstand gas storage pressures of more than 335 MPa (50,000 PSI) which allows hydrogen or methane to be quickly loaded and stored at gasoline energy density. This enables quick loading to very high energy storage densities followed by heat transfer out of the basal planes as the pressure is reduced to nominal values.

Planar walls 88 provide light-weight strength reinforcement to the containment membrane 90 that surrounds the expanded layers of planar walls. Central tensile strength member 86 is utilized to impart strength in the direction orthoginal to the direction of strengthening by planar walls 88 to provide an extremely robust tank assembly for withstanding the forces produced by: rapid fluid-loading pressure, inertia loading, fluid unloading pressure, and external forces applied to said system. Further strengthening is provided by 92 which also provides circulation of heat exchange fluids to facilitate rapid heat transfer for loading and unloading the system.

Figure 10:
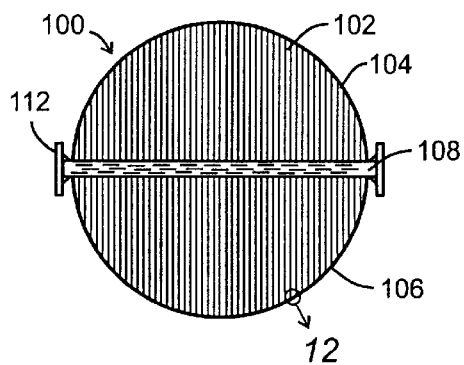
FIG. 10 is a sectional view of a device illustrating the principles of the present invention.
Figure 11:
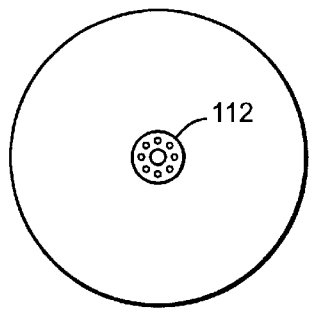
FIG. 11 is an end view of the embodiment of FIG. 10.

Another embodiment 100 of the invention is shown in FIG. 10. Although it may be constructed in nearly any desired shape it is preferably spherical as shown. Shaped single crystals of graphite or boron nitride are used as precursors to create reinforcement disks 102. These disks are diffusion bonded to a thin membrane 104. Membrane 104 is reinforced on the outside surface by high strength films 106 which provide good protection against fire impingement and point loading. Flow into and out of the storage vessel is through perforated tube 108 which is hermetically bonded to membrane 104. Tube 108 may be terminated as desired with fittings and flanges 112 for mounting purposes.

Single crystals of graphite or boron nitride are prepared in the desired shapes by pyrolytic growth or by machining techniques. A hole is bored to accommodate perforated tube 108. The assembly is loaded on appropriate tooling fixtures in an exfoliation furnace. A primary exfoliation gas such as hydrogen is diffused into the single crystals. Upon sudden depressurization, the single crystals are exfoliated. A secondary exfoliation fluid such as C $Cl_2F_2$, $CCl_3F$, $CHClF_2$, $CClF_2C$ $ClF_2$, or $CCl_2F$ $CClF_2$ is used to pressure saturate the exfoliated layers and then to further separate the exfoliated layers upon sudden pressure release.

Fully exfoliated single crystals are encased within a thin-walled membrane 104. Suitable materials for membrane 104 include spinformed aluminum, titanium, and deposited polymers such as polyvinylidene chloride, polyvinylidene fluoride, and ethylene chlorotrifluoroethylene. The polymer membranes may be metallized with vapor deposited aluminum to produce an impermeable composite membrane.

High-strength exterior coatings are contemplated to provide reinforcement and scratch protection. Numerous processes have been published including U.S. Pat. No. 4,490,229, deposition by partial oxidation, and various sputtering techniques for providing diamond-like properties from deposited carbon films. Such diamond-like coatings including deposits of carbon, boron, boron carbide ($B_4C$), boron nitride (BN), silicon carbide (SiC), titanium boride ($TiB_2$) and refractory metal carbides may be deposited to form films with very high tensile strengths. Methods for making such deposits include radio frequency, plasma, and ion beam techniques and by vapor chemical depositions.

In the instance of diamond-like carbon deposition by high frequency multiple ion sources, the deposition is chemically inert, about as hard and strong as diamond, and clear with an index of refraction of about 3.2. Deposits 2 or 4 microns in thickness provide substantial reinforcement without causing point loading or stress-risers. Scratch and abrasion resistance approach diamond.

Figure 12:
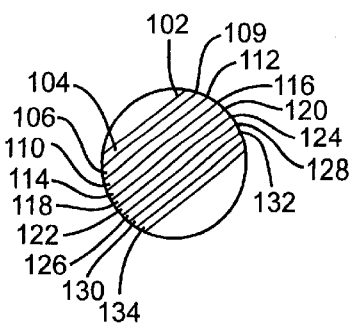
FIG. 12 is a magnified view of a portion of the embodiment of FIG. 10.

Several layers of thin coatings of highly different properties are contemplated including the use of alternating metallic and transparent dielectric layers to produce very high thermal isolation capabilities. Applications of the concepts of FIGS. 8 and 10 as cryogenic liquid storage vessels are contemplated. Inlet and outlet tube 108 is constructed to control heat exchange and membrane 104 is polished to a very high reflectance, coated with transparent diamond-like carbon 106 to a thickness of several thousand angstroms, and the assembly is alternately coated with additional layers of high reflectivity materials 109, 112, 116, 120, 124, 128, 132 etc., each of which is isolated by highly transparent dielectric layers 106, 110, 114, 118, 122, 126, 130, 134 etc., as shown in FIG. 12.

Heat exchange could be characterized by 5 to 10 layers of 98% or higher reflectance values. The protective inner layers of dielectric amorphous carbon would prevent oxidation or tarnishing while providing diamond-like tensile strength to reinforce membrane 104. Thermal isolation of vessel 100 is expected to be equal to the best vacuum thermos technology while burst strengths and payloads are much higher than the best pressure vessels because of the diamond-like strength of reinforcement disks 104 and layers 106 . . . 134.

SUMMARY, RAMIFICATIONS, AND SCOPE

Ordinarily hydrogen is about 14 times less dense than air and poses a seemingly impossible case for storage at the energy density of gasoline. My invention enables alternative fuels such as hydrogen and/or landfill methane to be stored at energy densities of gasoline as multiple layers in relatively motion-arrested status between a multitude of expansive, parallel, walls that may be as thin as one-atom. This compact storage system for fluids is provided by multitudes of closely spaced parallel planes of adsorptive material 88 that is contained within a substantially impervious barrier membrane 2. In normal pressure-containing embodiments, reinforcement 4 is wrapped upon the impervious barrier layer 2 to increase the burst strength of the assembly that results. In extreme pressure containing embodiments and/or where it is important to maximize the ratio of energy density per mass unit of storage system, material 88 provides internal reinforcement of barrier layer 2. Rapid gas addition and removal from storage are facilitated by extremely high heat exchange rates through 88 to membrane 2 and/or structure 92 which facilitates high or low heat transfer rates as needed. My invention's heat exchange method is extremely rugged and simplified compared to past approaches of interruptive plumbing through the adsorption system with a network of heat-exchanger tubing.

It thus will be understood that the objects of my invention have been fully and effectively accomplished. Therefore, this invention includes all modifications encompassed within the spirit and scope of the following claims and their legal equivalence, rather than by the examples given.

What is claimed is:

1. A vessel for storing a fluid, comprising:
   (a) an exterior shell defining a cavity and including at least one impermeable membrane for containing said fluid therein;
   (b) means for adding and removing said fluid;
   (c) means for substantially arresting forces produced by said fluid interacting with said exterior shell, said means for arresting forces including at least one internal structure located in said cavity, said at least one internal structure being made of a material selected from the group consisting of graphite crystals, boron nitride crystals, and exfoliated crystals of such materials, said internal structure dividing said cavity into a plurality of fluid receiving spaces.

2. The vessel of claim 1 in which said means for adding and removing said fluid comprises an inlet port and an outlet port.

3. The vessel of claim 1 wherein said at least one internal structure is attached to said shell by means selected from the group consisting of means for optimizing heat transfer to and from the interior of said vessel to the exterior of said vessel, means for minimizing heat transfer from the interior of said vessel to the exterior of said vessel, means for minimizing the overall system weight per unit of stored fluid, means for minimizing the fatigue degradation of the composite produced by said shell and said at least one internal structure, and means for arresting inertial forces produced by acceleration of said storage vessel.

4. The vessel of claim 1 wherein said exterior shell is protected from degrading radiation by a radiation blocking means.

5. The vessel of claim 1 wherein said exterior shell is protected from chemical degradation by a chemical barrier means.

6. The vessel of claim 1 wherein said exterior shell is protected from mechanical degradation by a high strength coating means.

7. The vessel of claim 1 wherein said at least one internal structure is at least partially prepared by decomposition of a carbon source selected from the group consisting of landfill methane, natural gas and petroleum constituents, and coal.

8. The vessel of claim 1 wherein said at least one internal structure is at least partially prepared by exfoliation for purposes selected from the group including reduction of the mass density of the resulting composite vessel, increasing the surface to volume ratio for adsorptive purposes, increasing the heat transfer rate for endothermic and exothermic fluid addition and release functions, and providing low impedance flow of fluid entering and exiting said fluid storage vessel.

9. The vessel of claim 1 wherein said at least one internal structure is at least partially prepared by exfoliation for purposes selected from the group consisting of storage of hydrogen, storage of methane, storage of nitrogen, storage of oxygen, storage of argon storage of natural gas and storage of helium.

10. The vessel of claim 1 wherein said at least one internal structure provides interaction with said fluid by means selected from the group consisting of means for capillary storage, means for adsorptive storage, means for removing heat from said fluid, means for adding heat to said fluid, means for arresting escape of gases, and means for enhancing fluid storage capabilities consisting of films of liquids that reside on said at least one internal structure.

11. The vessel of claim 1 wherein said at least one internal structure is provided for purposes selected from the group consisting of arrestment of axial forces, arrestment of radial forces, arrestment of inertial forces, arrestment of rapid fluid loading forces, and arrestment of forces due to expansion of fluids released from storage by endothermic heat exchange means.

12. The vessel of claim 1 including means for withstanding forces produced by conditions selected from the group consisting of high internal pressure, impact loading, inertia force wherein said system includes a central strengthening member located within said cavity which provides substantial support for withstanding axial forces and wherein said system includes high strength material integrated with said shell defining material of said vessel which provides support means for withstanding forces selected from the group consisting of: radial forces produced by storage pressure, axial forces, point loading forces produced by external forces, thermal stress loads produced by heat transfer to and from the fluid storage contents, and thermal degradation produced by fire impingement.

* * * * *